(12) United States Patent
Matsunaga et al.

(10) Patent No.: US 6,476,876 B1
(45) Date of Patent: Nov. 5, 2002

(54) CONTOUR EMPHASIZING CIRCUIT

(75) Inventors: Seiji Matsunaga, Kanagawa-ken (JP); Toru Aida, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/402,560

(22) PCT Filed: Jul. 24, 1998

(86) PCT No.: PCT/JP98/03318

§ 371 (c)(1),
(2), (4) Date: Oct. 5, 1999

(87) PCT Pub. No.: WO99/05856

PCT Pub. Date: Feb. 4, 1999

(30) Foreign Application Priority Data

Jul. 25, 1997 (JP) .............................................. 9-213956

(51) Int. Cl.$^7$ ................................................ H04N 5/21
(52) U.S. Cl. ........................ 348/625; 348/629; 382/266
(58) Field of Search ................................. 348/625, 606, 348/627, 628, 629, 630; 382/266, 267, 268, 269; 358/532; H04N 5/21

(56) References Cited

U.S. PATENT DOCUMENTS

| | | | | |
|---|---|---|---|---|
| 4,677,461 A | * | 6/1987 | Mizutani et al. ............. | 348/630 |
| 4,733,300 A | * | 3/1988 | Sugiyama et al. ............ | 348/448 |
| 4,918,528 A | * | 4/1990 | Oohashi ....................... | 348/625 |
| 5,561,473 A | * | 10/1996 | Saionji et al. ............... | 348/628 |
| 5,731,845 A | * | 3/1998 | Kashimura ................... | 348/630 |

FOREIGN PATENT DOCUMENTS

| | | |
|---|---|---|
| JP | 6-46293 | 2/1994 |
| JP | 6-350877 | 12/1994 |
| JP | 7-245718 | 9/1995 |

* cited by examiner

*Primary Examiner*—John Miller
*Assistant Examiner*—Trang U. Tran
(74) *Attorney, Agent, or Firm*—Flynn, Thiel, Boutell & Tanis, P.C.

(57) ABSTRACT

A contour emphasizing circuit in which VE detected by a vertical contour component detecting unit and HE detected by a horizontal contour component detecting unit are added by a first adder and then multiplied by a coefficient, and the product is added to an input video signal by a second adder to output an emphasized-contour video signal. The circuit contains a comparing/judging unit for comparing VE with HE and judging whether or not the absolute value of the difference between them is smaller than a present value S, and a coefficient change-over multiplier unit for changing the coefficient by which the sum (VE+HE) is multiplied over to K/2 or K according to the judging signal. For a pixel from which both HE and VE are detected, the coefficient change-over multiplier is changed from K or K/2 by a judgment signal of the comparing/judging unit to decrease the contour emphasizing component. This prevents excessive contour emphasis of the pixel from which both HE and VE are detected, and natural profile emphasis is carried out.

3 Claims, 3 Drawing Sheets

○ : Vertical Contour Component Detection Point

△ : Horizontal Contour Component Detection Point

■ : Vertical and Horizontal Contour Component Detection Point

CONTOUR EMPHASIZING CIRCUIT

FIELD OF THE INVENTION

The present invention relates to a contour emphasizing circuit, wherein contour components in the horizontal and vertical directions are detected from an input video signal (e.g., digital input video signal), the detected contour components in the two directions are added, the resulting sum is multiplied by a coefficient, and the resulting product is added to an incoming video signal (e.g., incoming digital video signal) to obtain a contour-emphasized video signal.

BACKGROUND ART

As thin and lightweight display devices, the PDP (Plasma Display Panel) and LCD (Liquid Crystal Display) are becoming popular among users. Each of these display devices is directly driven by digital video signals and comprises a contour emphasizing circuit, such as the one shown in FIG. 1, to obtain a contour-emphasized image based on the contour-emphasized video signal obtained from an incoming video signal.

The contour emphasizing circuit shown in FIG. 1 comprises a vertical contour component detection stage 10, a horizontal contour component detection stage 12, a first adder 14, a second adder 16 and a multiplier 18. The vertical contour component detection stage 10 comprises 1-line delay elements 22 and 24 (e.g., line memory), an adder 26 for adding the output signal from the 1-line delay element 24 and the video signal Y input to input terminal 20, a multiplier 28 for multiplying for output the sum obtained by the adder 26 by a coefficient ¼, a multiplier 30 for multiplying for output the signal output from the 1-line delay element 22 by a coefficient ½, a subtracter 32 for subtracting the output signal of the multiplier 28 from the output signal of the multiplier 30 and a 1-dot delay element 34 for outputting the signal from the subtracter 32 after giving a time lag for 1 dot, wherein the contour component in the vertical direction VE (hereinafter referred to as vertical contour component) is detected, for output, from a picture element immediately above and a picture element immediately below a reference picture element.

The horizontal contour component detection stage 12 comprises 1-dot delay elements 36 and 38, each sequentially delaying for 1 dot the output signals from the 1-line delay element 22, an adder 40 for adding the output signal of the 1-line delay element 22 and the output signal of the 1-dot delay element 38, a multiplier 42 for multiplying for output the sum obtained by the adder 40 by a coefficient ¼, a multiplier 44 for multiplying for output the output signal of the 1-dot delay element 36 by a coefficient ½ and a subtracter 46 for subtracting the output signal of the multiplier 42 from the output signal of the multiplier 44, wherein the contour component in the horizontal direction of the reference picture element HE (hereinafter referred to as horizontal contour component) is detected, for output, from the picture element immediately on the left and a picture element immediately on the right of the reference picture element.

The first adder 14 adds the vertical contour component VE detected by the vertical contour component detection stage 10 to the horizontal contour component HE detected by the horizontal contour component detection stage 12, the multiplier 18 multiplies, for output, the sum (VE+HE) obtained by the first adder 14 by a variable coefficient K, and the second adder 16 adds the output signal of the multiplier 18 to the output signal from the 1-dot delay element 36 (input video signal Y having a time lag for 1 line and a time lag for 1 dot) and outputs a contour-emphasized video signal (Y+K×(VE+HE)) to the output terminal 48. The contour emphasizing rate varies with the variable coefficient K.

However, the contour-emphasizing circuit shown in FIG. 1 has a problem that the multiplier 18 multiplies the output signal from the first adder 14 by a common coefficient K regardless of whether the contour component (VE or HE) is output from one of the vertical contour component detection stage 10 and the horizontal contour component detection stage 12 or whether the contour components (VE and HE) are output from both, thereby causing the contour including both the vertical contour component and the horizontal contour component to be emphasized excessively to end up with an image including an unnatural portion.

In other words, as shown in FIG. 2, in a case such as when an image of any object is displayed in a background image, there exists a vertical contour component detection point (picture element denoted by ○ in the diagram) where the vertical contour component VE is detected, horizontal contour component detection point (picture element denoted by Δ in the diagram) where the horizontal contour component HE is detected and vertical-and-horizontal contour component detection point (picture element denoted by ■ in the diagram) where both the vertical contour component VE and horizontal contour component HE are detected.

The contour component at the vertical-and-horizontal contour component detection point (picture element denoted by ■ in the diagram) is equivalent to the sum of the vertical contour component VE and horizontal contour component HE (VE+HE), thereby causing a problem that the contour representing this detection point is excessively emphasized creating unnatural portion of the image. In FIG. 2, the block demarcated with the dotted line corresponds to one picture element.

The present invention is devised in consideration of the above problems of the prior art, and the object thereof is to prevent the excessive emphasis on the contour at the vertical-and-horizontal contour component detection point where both the vertical contour component VE and horizontal contour component HE are detected. In other words, the object of the present invention is to enable natural emphasis of the contour by preventing the contour at the vertical-and-horizontal contour component detection point from being overemphasized relative to other portions of contour (e.g., contours represented by the vertical contour component detection point and the horizontal contour component detection point).

DISCLOSURE OF THE INVENTION

The contour emphasizing circuit according to the present invention is designed so that the horizontal contour component HE and vertical contour component VE are detected from an input video signal, the detected horizontal contour component HE and vertical contour component VE are added, the sum is multiplied by a coefficient, and the product is added to the input video signal to generate a contour-emphasized video signal, while the contour emphasizing circuit comprises a comparison/determination stage for comparing the detected horizontal contour component with the detected vertical contour component to determine whether or not the absolute value of the difference between them is less than preset value S and a coefficient-selective multiplication stage for multiplying the sum of the horizontal contour component HE and the vertical contour component VE by selectively applying a coefficient K1 or K2 (0<K1<K2).

The preset value S of the comparison/determination stage is preset so that the absolute value of the difference between the horizontal contour component HE and the vertical contour component VE becomes less than the present value S when both HE and VE are detected, and the absolute value of the difference between the horizontal contour component HE and the vertical contour component VE exceeds the preset value S when one of HE and VE is detected.

Therefore, at the detection point (i.e., picture element, the same applies hereinafter) where only one of the horizontal contour component HE and vertical contour component VE is detected, the absolute value of the difference between HE and VE will not become less than the present value S, so that the coefficient of the comparison/determination stage becomes K2 (e.g., substantially equal value to K of the prior art), and the contour component to be emphasized becomes K2×HE or K2×VE, which is substantially equal to K×HE or K×VE of the prior art.

Further, at the detection point where both the horizontal contour component HE and vertical contour component VE are detected, the absolute value of the difference between HE and VE becomes less than the preset value S, so that the coefficient of the coefficient-selective multiplication stage is changed to smaller K1 from K2 by means of a determination signal (e.g., H-level signal) of the comparison/determination stage, and the contour component to be emphasized becomes K1×(HE+VE), which is a smaller value (e.g., ½) than K×(HE+VE) of the prior art. Thus, it becomes possible to prevent the contour at the point where both HE and VE are detected from being overemphasized, thereby providing a natural emphasizing of the contour.

Further, for easier composition, the coefficient-selective multiplication stage may be made to comprise a first multiplier for multiplying, for output, the sum of the horizontal contour component HE and vertical contour component VE by the coefficient K1, a second multiplier for multiplying, for output, the sum of the horizontal contour component HE and vertical contour component VE by the coefficient K2, and a selector for selecting, for output, either the output signal from the first multiplier or the output signal from the second multiplier.

Further, the coefficient K1 of the coefficient-selective multiplication stage may be set to ½ of the coefficient K2 so that the emphasis on the contour at the point where both the horizontal contour component HE and vertical contour component VE are detected is made substantially equal to the emphasis on the contour at the point where only one of the horizontal contour component HE and vertical contour component VE is detected, thereby enabling an extremely natural emphasis on the contour.

BEST MODE FOR CARRYING OUT THE INVENTION

In the following, the present invention will be described in detail referring to the accompanying drawings.

Figure 1:
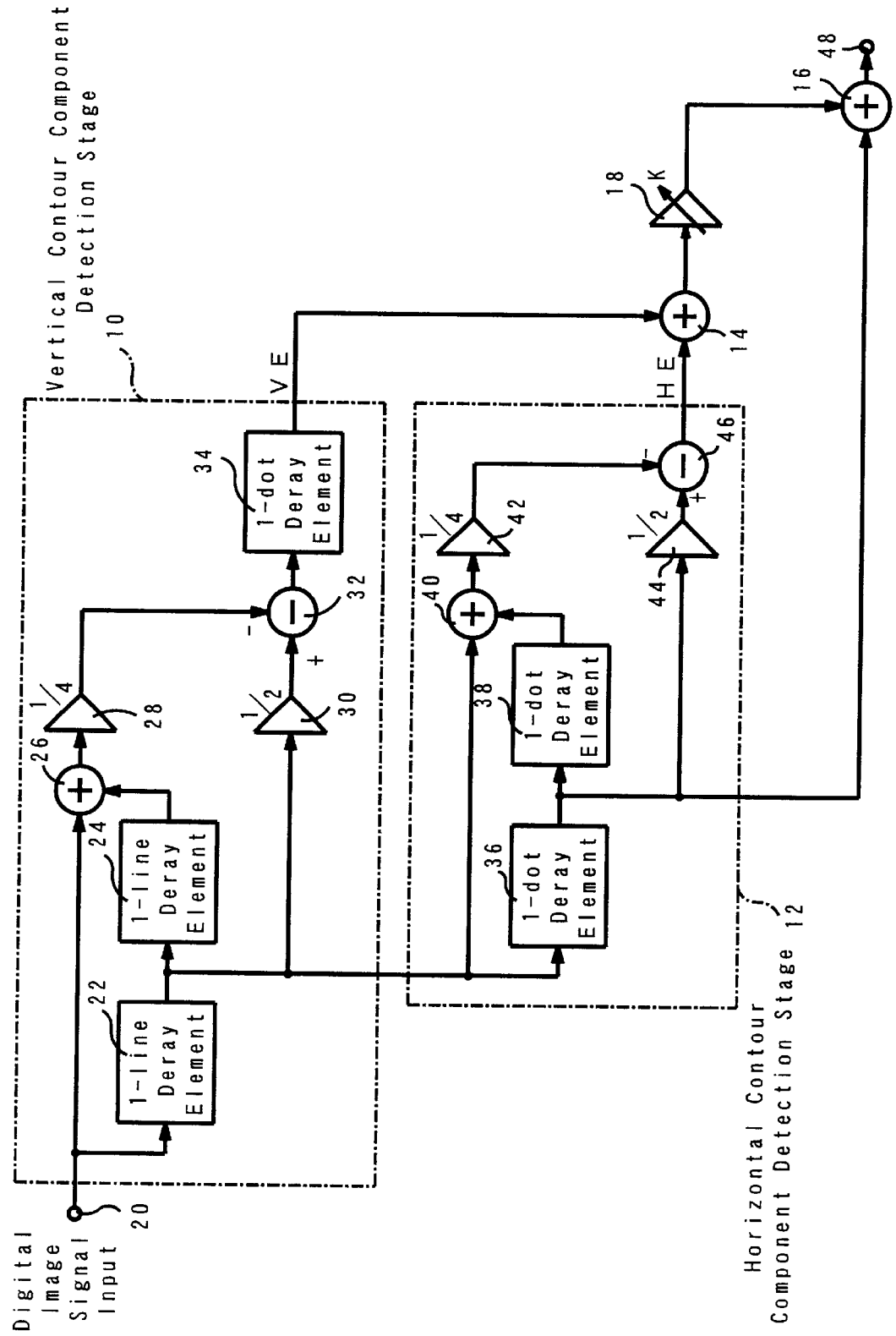
FIG. 1 is a block diagram showing a conventional contour emphasizing circuit.
Figure 3:
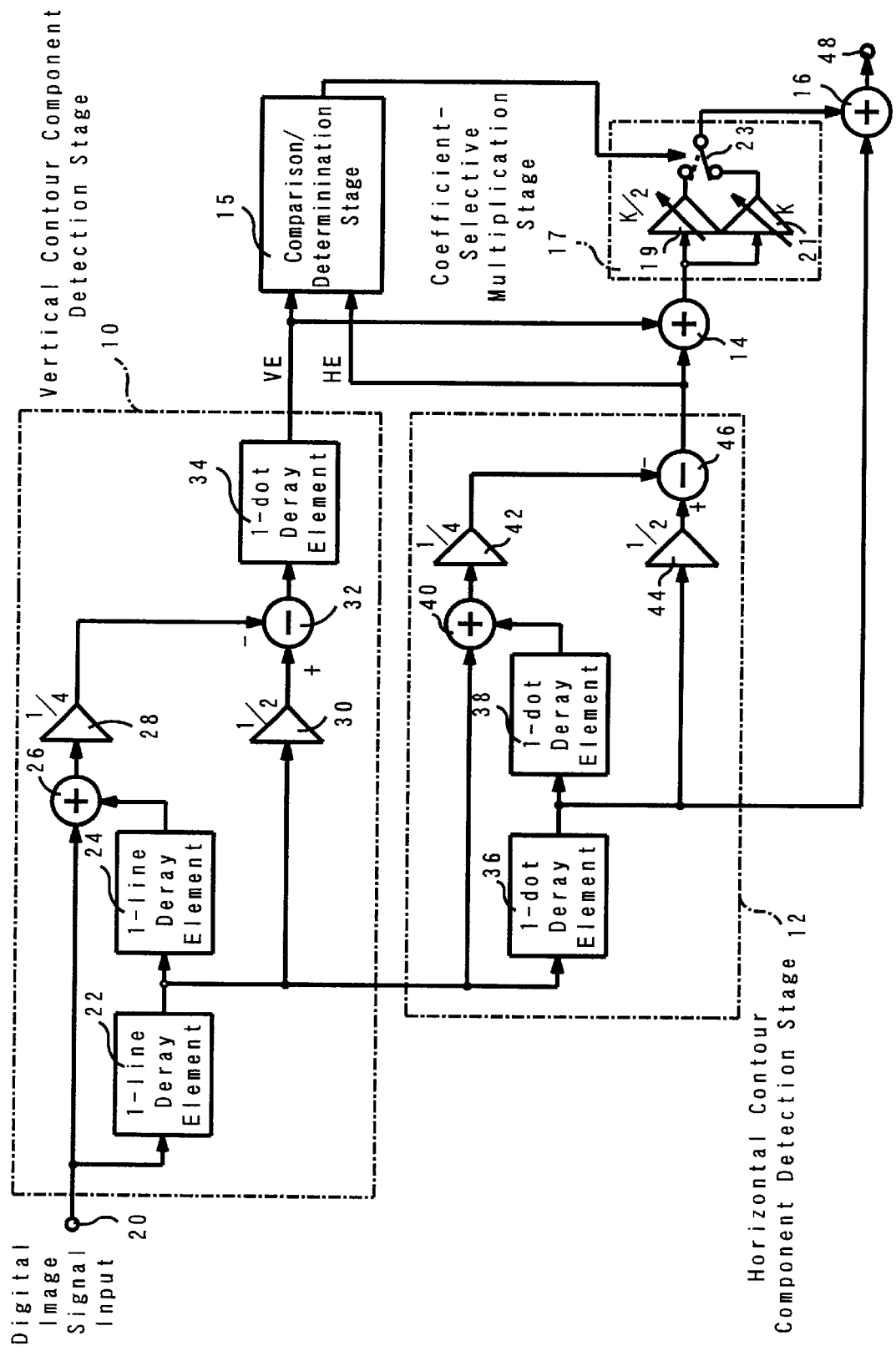
FIG. 3 is a block diagram showing a contour emphasizing circuit as an embodiment of the present invention.

FIG. 3 shows a contour emphasizing circuit as an embodiment of the present invention, wherein those parts common to those shown in FIG. 1 will be assigned common reference numerals and symbols.

In FIG. 3, numeral 10 denotes the vertical contour component detection stage for detecting the contour component in the vertical direction; numeral 12, the horizontal contour component detection stage for detecting the contour component in the horizontal direction; numerals 14 and 16, the first and second adders; 15, the comparison/determination stage; and 17, the coefficient-selective multiplication stage.

The vertical contour component detection stage 10, like the case shown in FIG. 1, comprises 1-line delay elements 22 and 24, an adder 26, multipliers 28 and 30, a subtracter 32 and a 1-dot delay element 34, and is designed to detect, for output, the vertical contour component VE of the reference picture element from the picture elements immediately above and immediately below the reference picture element.

The horizontal contour component detection stage 12, like the case of FIG. 1, comprises 1-dot delay elements 36 and 38, adder 40, multipliers 42 and 44 and subtracter 46, and is designed to detect, for output, the horizontal contour component of the reference picture element from the picture element immediately on the right side and the picture element immediately on the left side of the reference picture element.

The first adder 14 adds, for output, the vertical contour component VE, detected by the vertical contour component detection stage 10, and horizontal contour component HE, detected by the horizontal contour component detection stage 12.

The comparison/determination stage 15 compares the vertical contour component, detected by the vertical contour component stage 10, with the horizontal contour component, detected by the horizontal contour component detection stage 12, to determine whether the absolute value (|VE−HE|) of the difference between them is less than the preset value S1, and outputs a corresponding determination signal (e.g., H-level or L-level signal).

The preset value S is given in order to distinguish a case where both the vertical contour component VE and the horizontal contour component HE are detected from a case where only one of the vertical contour component VE and horizontal contour component HE is detected. The preset value S is set, for example, to a value at which |VE−HE|≦S holds not only when the contour is as clear as that of a letter, or when both the vertical contour component VE and horizontal contour component are detected with the difference thereof being substantially 0(VE≈HE) but also when only one of the vertical contour component VE and horizontal contour component HE is detected, even when the contour is not as clear as that of an image having contrastive thick and thin gradations, while the preset value S is set to a value at which |VE−VH|>S holds when only one of the vertical contour component VE and horizontal contour component HE is detected while the other is not detected.

The coefficient-selective multiplication stage 17 comprises a first multiplier 19 for multiplying by variable coefficient (½) K, an example of K1, a second multiplier 19 for multiplying by variable coefficient K, an example of K2, and a selective switch 23 for selectively outputting the signal from the first multiplier 19 or the signal from the second multiplier 21 depending on determined signal (e.g., H-level or L-level signal) from the comparison/determination stage 15.

The second adder 16 adds the output signal of the coefficient-selective multiplication stage 17 to the input video signal Y taken out from the output side of the 1-dot delay element 36 of the horizontal contour component detection stage 12, and outputs a contour-emphasized video signal to output terminal 48.

Next, the functions of the components shown in FIG. 3 will be described referring to FIG. 2.

(1) The vertical contour component VE and horizontal contour component HE are detected from the digital video signal input to terminal 20, by the vertical contour component detection stage 10 and the horizontal contour component detection stage 12 respectively, and the detected vertical contour component VE and horizontal contour component HE are added by the first adder 14 for inputting to the coefficient-selective multiplier 17.

(2) The comparison/determination stage 15 compares the vertical contour component VE and horizontal contour component HE, which are detected by the processes described in (1), to determine whether or not the absolute value (|VE−HE|) of the difference between them is less than the preset value S, and outputs the corresponding determined signal to the coefficient-selective multiplication stage 17. For instance, when both VE and HE are detected to result in 51 VE−HE|≦S, an H-level signal is output to the coefficient-selective multiplication stage 17, while an L-level signal is output to the same when only one of VE and HE is detected to result in |VE−HE|>S.

(3) Therefore, when both VE and HE are detected to result in |VE−HE|>S, a selector 23 incorporated into the coefficient-selective multiplication stage 17 is connected to the side indicated with a dotted line, the sum obtained by the first adder 14 is multiplied by the coefficient k/2 by means of the first multiplier 19 in the coefficient-selective multiplication stage 17, and the product is output to the second adder 16 to be added to the input video signal Y, and the contour-emphasized video signal is output to output terminal 48.

Further, when only one of VE or HE is detected to result in 51 VE−HE|>S, the selector 23 of the coefficient-selective multiplication stage 17 is connected to the side indicated with the dotted line, the sum obtained by the first adder 14 is multiplied by the coefficient K by means of the second multiplier 21 of the coefficient-selective multiplication stage 17 to be input to the second adder 16 where the product is added to the input video signal Y to be outputted to the terminal 48 as a contour-emphasized video signal.

Figure 2:
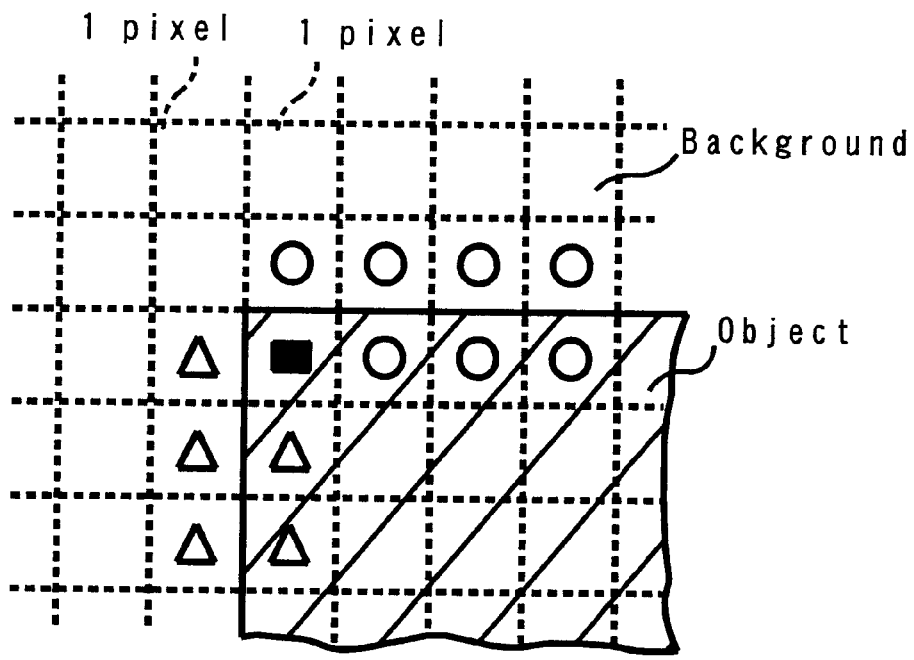
FIG. 2 is a diagram showing a vertical contour component detection point, a horizontal contour component detection point and a vertical-and-horizontal contour component detection point respectively existing on the boundary of a background image and an image of an object in a case where an image of an object is to be displayed in the background image on a display device using a PDP.

(4) Therefore, when displaying an image including an image of an object in the background, there are cases (a), (b) and (c) as shown in FIG. 2.

(a) At the vertical contour component detection point (i.e., picture element denoted by ○ in the diagram) where only the vertical contour component is to be detected, 51 VE−HE|>S holds, so that the video signal emphasized for contour and to be outputted to the output terminal 48 becomes Y+K×VE, which is equivalent to the case of the prior art shown in FIG. 1.

(b) At the horizontal contour component detection point (i.e., picture element denoted by Δ in the diagram) where only the horizontal contour component HE is detected, 51 VE−HE|>S holds, so that the video signal emphasized for contour and to be outputted to the output terminal 48 becomes Y+K×HE, which is equivalent to the case of the prior art shown in FIG. 1.

(c) At the vertical-and-horizontal contour component detection point (i.e., picture element denoted by ■ in the diagram), 51 VE−HE|≦S holds, so that video signals emphasized for contour and to be outputted to the output terminal 48 becomes Y+(½)K×(VE+HE), and the emphasized contour component becomes substantially a half of (K×(VE+HE)) of the prior art shown in FIG. 1.

In general, VE is substantially equal to HE, so that (½)K×(VE+HE) is substantially equal to K×VE or K×HE.

Therefore, the emphasis on the contour at the vertical-and-horizontal contour component detection point (denoted by ■ in the diagram) becomes substantially equal to that at the vertical contour component detection point (denoted by ○ in the diagram) and to that at the horizontal contour component detection point (denoted by Δ in the diagram), so that very natural emphasis on the contour can be accomplished.

In connection with the above embodiment, a description is made as to a case where the coefficient K1 of the coefficient-selective multiplication stage is set to ½ of K2 in order to substantially equalize the contour emphasis at the detection point where both the vertical contour component VE and horizontal contour component HE are detected and the contour emphasis at the detection point where only one of the vertical contour component or horizontal contour component is detected, but the present invention is not limited to this case and is applicable to any case where the condition, 0<K1<K2, is satisfied for preventing the overemphasis on the contour at the point where both the vertical contour component and horizontal contour component are detected.

In connection with the above embodiment, a description is made as to a case where, for easier composition, the coefficient-selective multiplication stage comprises the first multiplier, the second multiplier and the selector, but the present invention is not limited to this case and is applicable to any case where the coefficient-selective multiplication stage is capable of selecting the coefficient K1 or coefficient K2, on condition that 0<K1<K2, depending on the determination signal from the comparison/determination stage.

INDUSTRIAL AVAILABILITY

As described in the foregoing, the present invention relates to a contour emphasizing circuit designed to detect the horizontal contour component HE and vertical contour component VE, to add the detected horizontal contour component and vertical contour component, to multiply the resulting sum by a coefficient, and to add the resulting product to the input video signal to output a contour-emphasized video signal, and is applicable for preventing overemphasis on the contour of the picture element when both the vertical contour component and horizontal contour component thereof are detected in a case such that an image of an object is to be displayed in a background image displayed on a PDP display device.

What is claimed is:

1. A contour emphasizing circuit for producing a contour emphasized video signal from an input video signal, said circuit comprising: a horizontal contour component detection stage for detecting a horizontal contour component from the input video signal; a vertical contour component detection stage for detecting a vertical contour component from the input video signal; a first adder for adding the detected horizontal contour component and the detected vertical contour component; a comparison/determination stage for determining whether or not the absolute value of the difference between the detected horizontal contour component and the detected vertical component is less than a preset value and outputting a determination signal; a coefficient-selective multiplication stage for selecting coefficient K1 or K2, 0<K1<K2, based on the determination signal, and multiplying the selected coefficient by the sum of the detected horizontal contour component and the detected vertical contour component to obtain a resulting product; and a second adder for adding the resultant product to the input video signal and outputting the contour-emphasized video signal.

2. A contour emphasizing circuit for producing a contour emphasized video signal from an input video signal, said circuit comprising: a horizontal contour component detection stage for detecting a horizontal contour component from the input video signal; a vertical contour component detection stage for detecting a vertical contour component from the input video signal; a first adder for adding the detected horizontal contour component and the detected vertical contour component; a comparison/determination stage for determining whether or not the absolute value of the difference between the detected horizontal contour component and the detected vertical contour component is less than a preset value and outputting a determination signal; a coefficient-selective multiplication stage comprising a first multiplier for multiplying the sum of the detected horizontal contour component and the detected vertical contour component by a coefficient K1 to obtain a first resultant product, a second multiplier for multiplying the sum of the detected horizontal contour component and the detected vertical contour component by a coefficient K2 to obtain a second resultant product, 0<K1<K2, and a selector for selectively outputting the first resultant product or the second resultant product depending on the determination signal; and a second adder for adding the selectively outputted resultant product to the input video signal and outputting the contour-emphasized video signal.

3. A contour emphasizing circuit for producing a contour emphasized video signal from an input video signal, said circuit comprising: a horizontal contour component detection stage for detecting a horizontal contour component from the input video signal; a vertical contour component detection stage for detecting a vertical contour component from the input video signal; a first adder for adding the detected horizontal contour component and the detected vertical contour component; a comparison/determination stage for determining whether or not the absolute value of the difference between the detected horizontal contour component and the detected vertical contour component is less than a preset value and outputting a determination signal; a coefficient-selective multiplication stage for selecting coefficient K1 or K2, with K1 being greater than zero and equal to ½ K2, based on the determination signal, and multiplying the selected coefficient by the sum of the detected horizontal contour component and the detected vertical contour component to obtain a resultant product; and a second adder for adding the resultant product to the input video signal and outputting the contour-emphasized video signal.

* * * * *